Z. F. MAHORNEY.
GRAPE-VINE SUPPORTS.

No. 178,173. Patented May 30, 1876.

WITNESSES
M. P. Utley.
Robert Everett

INVENTOR
Zach. F. Mahorney.
Gilmore, Smith & Co.
ATTORNEYS

UNITED STATES PATENT OFFICE.

ZACHARIAH F. MAHORNEY, OF LADOGA, INDIANA.

IMPROVEMENT IN GRAPE-VINE SUPPORTS.

Specification forming part of Letters Patent No. 178,173, dated May 30, 1876; application filed April 22, 1876.

*To all whom it may concern:*

Be it known that I, ZACHARIAH F. MAHORNEY, of Ladoga, in the county of Montgomery and State of Indiana, have invented a new and valuable Improvement in Grape-Vine Support; and I do hereby declare that the following is a full, clear, and exact description of the construction and operation of the same, reference being had to the annexed drawings, making a part of this specification, and to the letters and figures of reference marked thereon.

Figure 1:
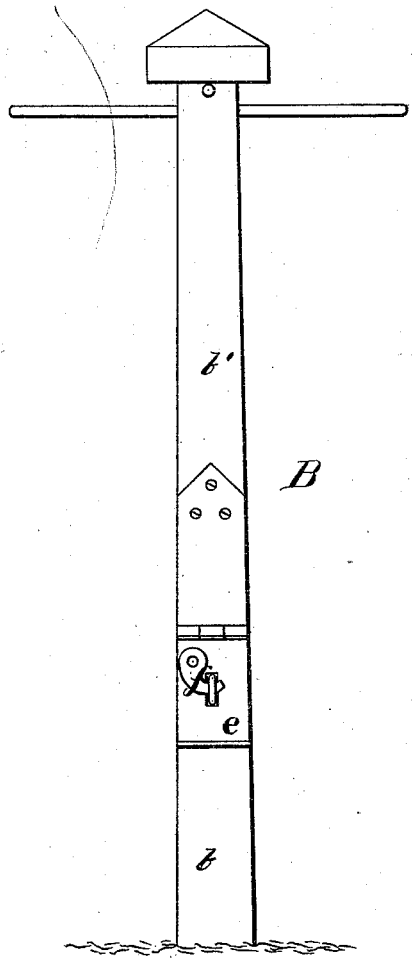
Figure 2:
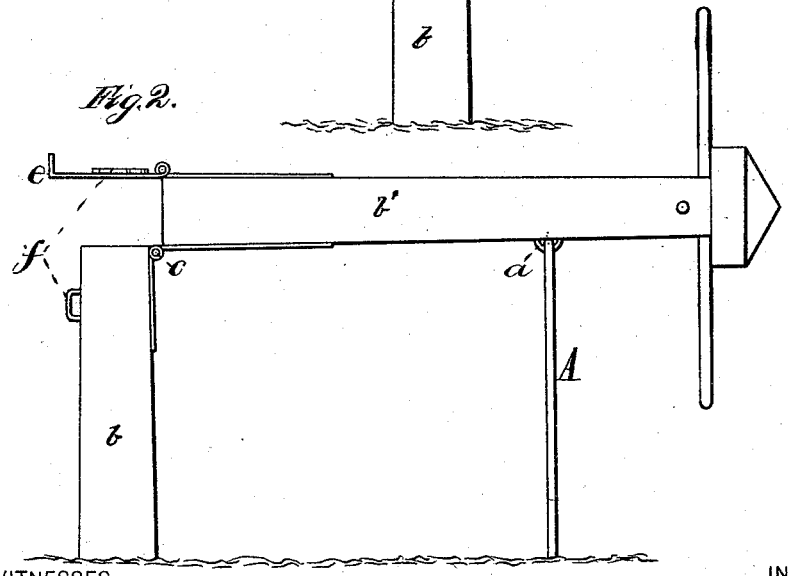

Figure 1 of the drawings is a representation of a front elevation of my grape-vine support; and Fig. 2 is a side view, showing the upper portion inclined.

The invention which I am about to describe has relation to means for supporting grape-vines, hop-vines, &c., whereby the vines can be lowered and sustained in any required position for gathering the fruit.

The nature of my invention consists in a sectional standard or post, adapted for use for trellises, or for grape-vines, or other vines from which fruit is to be gathered, the said sections being hinged or pivoted together, and the upper section being provided with a prop, which, when it is thrown down in a convenient position for pruning the vine or gathering the fruit, will sustain it in said position, as will be hereinafter more fully explained.

In the annexed drawings, Figure 1 represents the post erect; and Fig. 2 represents the upper portion of the post inclined, and sustained in such position by a prop, A, which is connected to said upper portion by a staple, $a$.

The post illustrated in the annexed drawings is designated by the capital letter B, and is composed of two parts, $b\ b'$, which are connected by a hinge, $c$, on one side of the joint, and on the opposite side by a hinged slotted strap, $e$, a staple, and a hook, $f$.

In carrying my invention into practice I shall have the lower stationary portion $b$ of the post B of such height that when the upper portion $b'$ is inclined, as represented in Fig. 2, there will be no liability of injuring the trunk or stems of the vine.

When the post B is erected it will be held in such position by the staple and hook $f$; and, when the upper section $b'$ is inclined for the purpose of pruning the vine or gathering the fruit, it is sustained by the prop A, which is connected, by an eye and staple, $g$, to the said upper section. At or near the upper end of the hinged section of the posts are rods, which pass through said section at right angles to each other, for the purpose of attaching the ropes or wires on which the vines grow.

What I claim as new, and desire to secure by Letters Patent, is—

The fixed section $b$, having a staple near its upper end, in combination with the section $b'$, hinged to the upper end of the section $b$, and provided with the hinged slotted strap $e$, hook $f$, and pivoted prop A, substantially as described, and for the purpose set forth.

In testimony that I claim the above I have hereunto subscribed my name in the presence of two witnesses.

ZACHARIAH FISHER MAHORNEY.

Witnesses:
   PATRICK MCNARY,
   THOMAS D. MORRIS.